United States Patent
Poinsot et al.

(10) Patent No.: US 10,907,522 B2
(45) Date of Patent: Feb. 2, 2021

(54) INTERNAL BOX FLOW DEFLECTOR FOR A VEHICLE EXHAUST SYSTEM MIXER ASSEMBLY

(71) Applicant: Faurecia Systemes D'echappement, Nanterre (FR)

(72) Inventors: Laurent Poinsot, Montbéliard (FR); Laurent Cuny, Beaucourt (FR)

(73) Assignee: Faurecia Systemes D'echappement

( * ) Notice: Subject to any disclaimer, the term of this patent is extended or adjusted under 35 U.S.C. 154(b) by 71 days.

(21) Appl. No.: 16/054,237

(22) Filed: Aug. 3, 2018

(65) Prior Publication Data

US 2020/0040793 A1 Feb. 6, 2020

(51) Int. Cl.

| F01N 3/28 | (2006.01) |
|---|---|
| F01N 3/20 | (2006.01) |
| F01N 3/035 | (2006.01) |
| B01F 5/04 | (2006.01) |
| B01F 5/06 | (2006.01) |

(52) U.S. Cl.
CPC .......... *F01N 3/2892* (2013.01); *B01F 5/0451* (2013.01); *B01F 5/0606* (2013.01); *F01N 3/035* (2013.01); *F01N 3/208* (2013.01); *F01N 2240/20* (2013.01); *F01N 2610/02* (2013.01)

(58) Field of Classification Search
CPC ........ F01N 3/2892; F01N 3/208; F01N 3/035; F01N 2610/02; F01N 2240/20; B01F 5/0451; B01F 5/0606
See application file for complete search history.

(56) References Cited

U.S. PATENT DOCUMENTS

| 6,444,177 B1* | 9/2002 | Muller | B01D 53/8631 |
| | | | 422/177 |
| 2007/0065349 A1* | 3/2007 | Merry | C03C 3/083 |
| | | | 422/179 |
| 2010/0257849 A1 | 10/2010 | Kowada | |
| 2010/0300080 A1* | 12/2010 | Peters | F01N 3/2066 |
| | | | 60/297 |

(Continued)

FOREIGN PATENT DOCUMENTS

| EP | 3064724 A1 | 9/2016 |
| WO | 2015119617 A1 | 8/2015 |

(Continued)

*Primary Examiner* — Matthew T Largi
(74) *Attorney, Agent, or Firm* — Carlson, Gaskey & Olds, P.C.

(57) ABSTRACT

A mixer includes a baffle having a baffle inlet receiving exhaust gas from an upstream exhaust component and a baffle outlet directing exhaust gas to a downstream exhaust component. A cover provides a chamber between an internal surface of the cover and the baffle. An internal box is positioned within the chamber to cover the baffle outlet and includes a bottom wall with a peripheral wall extending about at least a portion of an outer periphery of the bottom wall. At least one deflector wall is positioned within the internal box to provide a wall surface that is spaced from the peripheral wall to define an internal flow path that diverts exhaust gas at least partially around the baffle outlet before exiting the baffle outlet. An opening is located in the peripheral wall to receive exhaust gas exiting the inlet and to direct exhaust gas into the internal flow path.

23 Claims, 4 Drawing Sheets

(56) References Cited

U.S. PATENT DOCUMENTS

| | | | |
|---|---|---|---|
| 2011/0094206 A1* | 4/2011 | Liu | F01N 3/2892 |
| | | | 60/274 |
| 2011/0099978 A1* | 5/2011 | Davidson | B01D 53/9495 |
| | | | 60/274 |
| 2011/0308234 A1 | 12/2011 | De Rudder et al. | |
| 2016/0115844 A1 | 4/2016 | De Rudder et al. | |
| 2016/0138454 A1 | 5/2016 | Alano et al. | |
| 2016/0251990 A1* | 9/2016 | Dimpelfeld | F01N 3/2066 |
| | | | 60/324 |
| 2018/0142597 A1 | 5/2018 | Riepshoff et al. | |

FOREIGN PATENT DOCUMENTS

| | | | |
|---|---|---|---|
| WO | 2017054179 A1 | 4/2017 | |
| WO | 2018017139 A1 | 1/2018 | |

\* cited by examiner

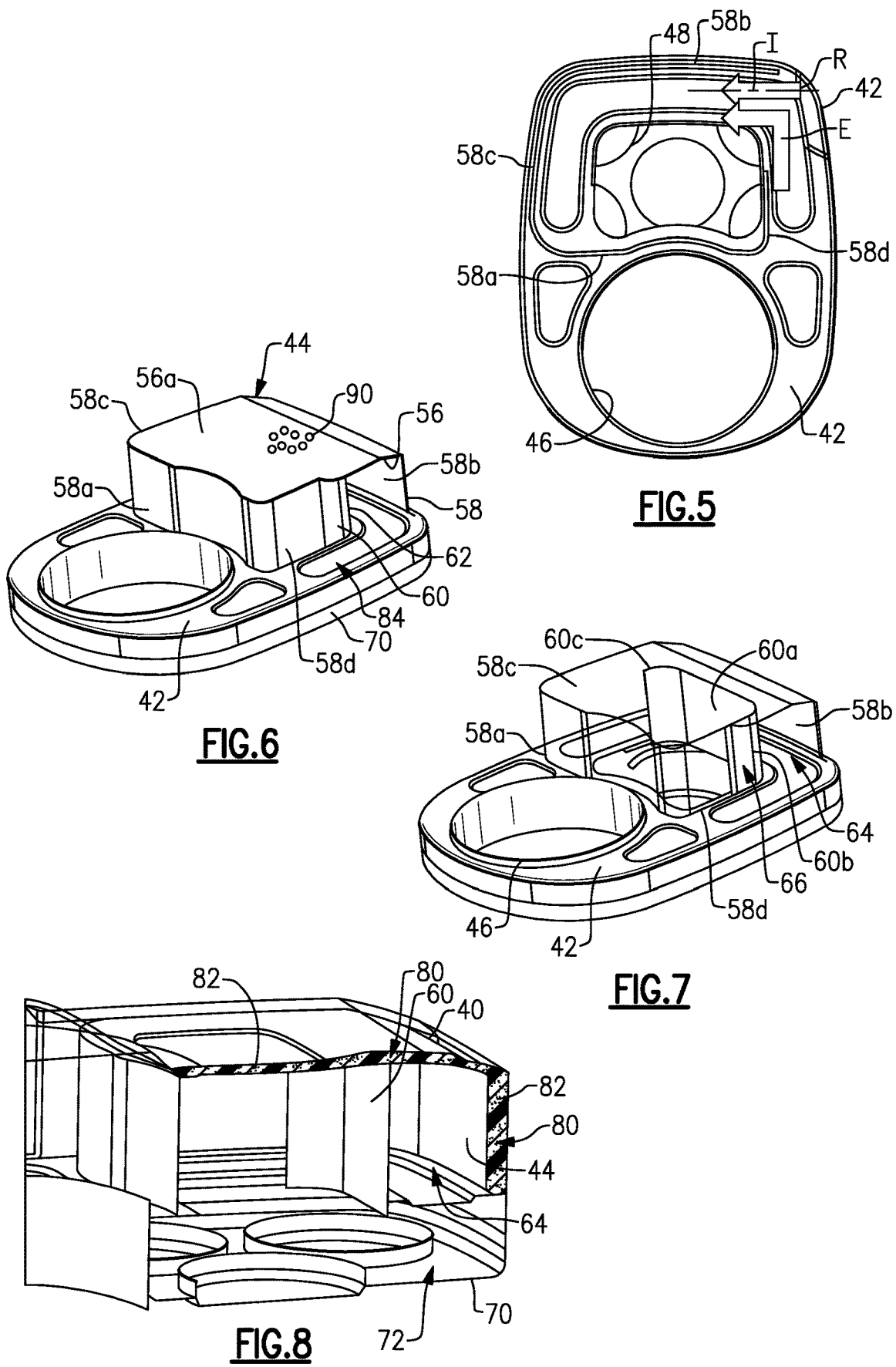

INTERNAL BOX FLOW DEFLECTOR FOR A VEHICLE EXHAUST SYSTEM MIXER ASSEMBLY

BACKGROUND OF THE INVENTION

An exhaust system conducts hot exhaust gases generated by an engine through various exhaust components to reduce emissions and control noise. The exhaust system includes an injection system with a doser that injects a reducing agent, such as a solution of urea and water for example, upstream of a selective catalytic reduction (SCR) catalyst. A mixer is positioned upstream of the SCR catalyst and mixes engine exhaust gases and products of urea transformation.

The doser typically sprays the reducing agent into the exhaust stream. As the spray contacts internal surfaces of the mixer, urea despots can form which can impede the flow of the exhaust gases and reduce SCR catalyst performance over time. It is important to configure the mixer assembly with mixing elements such that the spray and exhaust gas are thoroughly mixed together prior to entering the SCR catalyst.

SUMMARY OF THE INVENTION

In one exemplary embodiment, a mixer assembly includes at least one baffle having a baffle inlet that receives exhaust gas from an upstream exhaust component and baffle outlet that directs exhaust gas to a downstream exhaust component. A cover provides a chamber between an internal surface of the cover and the baffle. An internal box is positioned within the chamber to cover the baffle outlet and includes a bottom wall with a peripheral wall extending about at least a portion of an outer periphery of the bottom wall. At least one deflector wall is positioned within the internal box to provide a wall surface that is spaced from the peripheral wall to define an internal flow path that diverts exhaust gas at least partially around the baffle outlet before exiting the baffle outlet. An opening is located in the peripheral wall to receive exhaust gas exiting the baffle inlet and to direct exhaust gas into the internal flow path.

In another exemplary embodiment, a vehicle exhaust system includes at least one of an upstream catalyst and/or filter, at least one downstream catalyst, and a mixer assembly that connects an outlet from the at least one of the upstream catalyst and/or filter to an inlet to the at least one downstream catalyst. The mixer assembly includes at least one baffle having a baffle inlet that receives exhaust gas from the at least one of an upstream catalyst and/or filter and a baffle outlet that directs exhaust gas to the at least one downstream catalyst, a cover comprising a base wall with an outer wall extending about a periphery of the base wall to define a chamber between the at least one baffle and an internal surface of the cover, and an internal box positioned within the chamber. The internal box includes a bottom wall with a peripheral wall extending about at least a portion of an outer periphery of the bottom wall, and the box is positioned between the base wall of the cover and the baffle outlet to leave an open volume between the base surface and baffle inlet. At least one deflector wall is positioned within the internal box to provide a wall surface that is spaced from the peripheral wall to define an internal flow path that diverts exhaust gas at least partially around the baffle outlet before exiting the baffle outlet. An opening is located in the peripheral wall to receive exhaust gas exiting the baffle inlet and to direct exhaust gas into the internal flow path.

In a further embodiment of any of the above, an injector is mounted to the cover to inject a reducing agent to mix with the exhaust gas, and wherein the injector is positioned to inject the reducing agent in a direction toward the opening in the peripheral wall.

In a further embodiment of any of the above, the at least one baffle comprises a first baffle and the chamber comprises a first chamber, and including a second baffle positioned on an opposite side of the first baffle from the cover to define a second chamber, and wherein the outlet from the first baffle directs a mixture of exhaust gas and reducing agent into the second chamber.

In a further embodiment of any of the above, the wall surface of the deflector wall has a first portion with a first side that faces the first wall and a second side that faces the second wall, and wherein the wall surface includes a second portion that curves from one end of the first portion to face the opening.

In a further embodiment of any of the above, the wall surface includes a third portion that curves from an opposite end of the first portion to direct a mixture of reducing agent and exhaust gas around the outlet.

These and other features of this application will be best understood from the following specification and drawings, the following of which is a brief description.

BRIEF DESCRIPTION OF THE DRAWINGS

FIG. 5 is a top view of the baffle.

FIG. 6 is a view similar to FIG. 3 but with the cover removed.

FIG. 7 is a view similar to FIG. 6 but showing the deflector wall as positioned within the internal box.

FIG. 8 is a section view of the mixer assembly.

DETAILED DESCRIPTION

Figure 1:
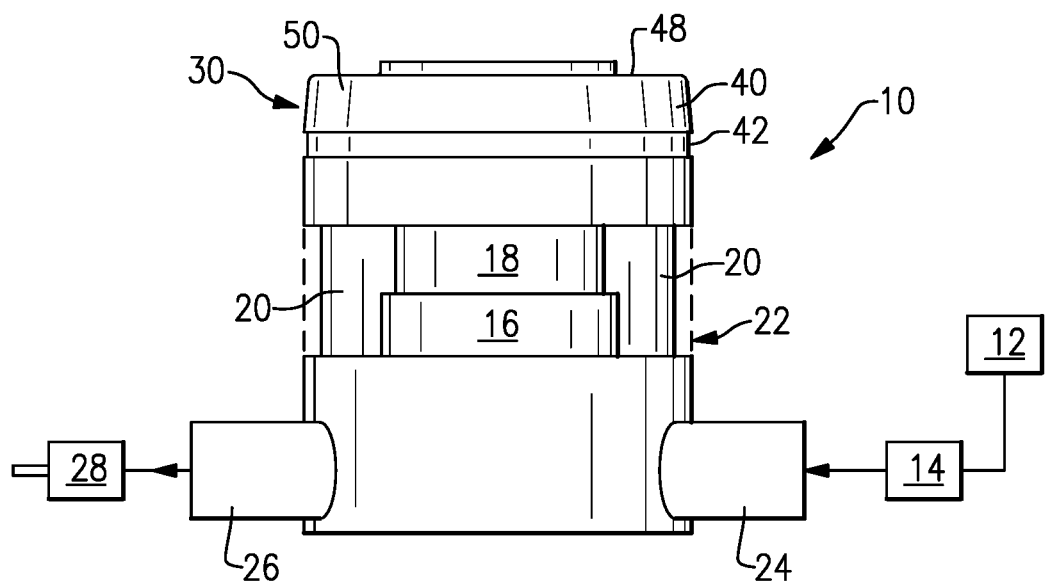
FIG. 1 schematically illustrates one example of an exhaust system component with a mixer assembly according to the subject invention.

FIG. 1 shows a schematic representation of a vehicle exhaust system 10 that conducts hot exhaust gases generated by an engine 12 through various upstream exhaust components 14 to reduce emissions and control noise as known. In one example configuration, the upstream exhaust components 14 direct exhaust gases into a diesel oxidation catalyst (DOC) 16 and then into a diesel particulate filter (DPF) 18 that is used to remove contaminants from the exhaust gas as known. Downstream of the DOC 16 and DPF 18 are one or more selective catalytic reduction (SCR) catalysts 20. A reducing agent, such as a solution of urea and water for example, mixes with exhaust gases to provide for the selective catalytic reduction of NOx to reduce the emissions of NOx in the exhaust system in a known manner.

Figure 2:
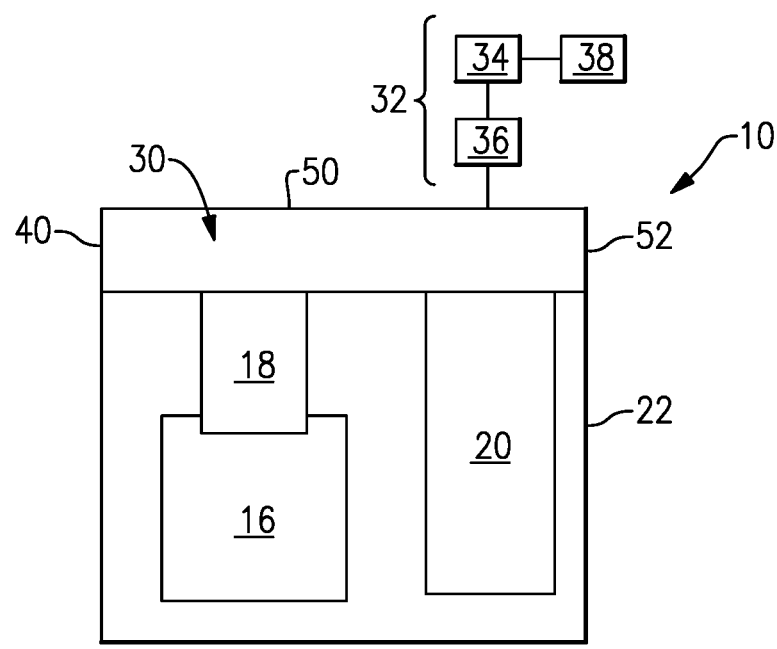
FIG. 2 is a side view of the system of FIG. 1.

As shown in FIG. 2, in one example, the DOC 16, DPF 18, and SCR catalyst(s) 20 are enclosed within a common housing 22. The housing 22 has an inlet 24 that receives exhausts exhaust from the engine 12 and any upstream exhaust components 14, and has an outlet 26 that directs exhaust gases to downstream exhaust components 28. The various downstream exhaust components 28 can include one or more of the following: pipes, filters, valves, additional catalysts, mufflers etc. These upstream 14 and downstream 28 components can be mounted in various different configurations and combinations dependent upon vehicle application and available packaging space.

A mixer assembly 30 is positioned downstream of the DOC 16 and DPF 18 and upstream of the SCR catalyst 20. The mixer assembly 30 is used to generate a swirling or rotary motion or a spiral flow of the exhaust gas. The configuration of the mixer assembly 30 will be discussed in greater detail below.

An injection system 32 (FIG. 2) is used to inject a reducing agent, such as a solution of urea and water for example, into the exhaust gas stream upstream from the SCR catalyst 20 such that the mixer assembly 30 can mix the urea and exhaust gas thoroughly together. The injection system 32 includes a fluid supply 34, an injector or doser 36, and a controller 38 that controls injection of the reducing agent as known. Any type of known supply 34 and known injector/doser 36 can be used with the mixer assembly 30. The structure and operation of the supply 34 and injector/doser 36 are well known and will not be discussed in further detail.

One example of the mixer assembly 30 is shown in greater detail in FIGS. 3-8. In this example, the mixer assembly 30 comprises a cover 40, a first baffle 42, and an internal box 44. The cover 40 has connection interface configured for attachment to the baffle 42 and/or housing 22. The cover 40 can be welded, brazed, fastened, etc. to the baffle 42 and/or housing 22 at the connection interface. As shown in FIG. 5, the baffle 42 has a baffle inlet 46 that receives exhaust gas exiting the DPF 18 and a baffle outlet 48 that directs the mixture of reducing agent and exhaust gas to the SCR catalyst(s) 20.

The cover 40 includes a base wall 50 with an outer wall 52 extending outwardly from the base wall 50 about a periphery of the base wall 50. The base wall also comprises a solid plate-like structure that encloses the baffle 42 between the cover 40 and housing 22. The cover 40 provides a chamber 54 (FIG. 4) between the internal surface of the cover 40 and the first baffle 42. The internal box 44 is positioned within the chamber 54 and includes a bottom surface 56 with a peripheral wall 58 extending about at least a portion of an outer periphery of the bottom surface 56. The bottom surface 56 is provided by a solid base wall 56a that forms a plate-like bottom of the box structure. The peripheral wall 58 forms the solid side walls of the box structure to prevent direct flow of exhaust gas from the baffle inlet 46 to the baffle outlet 48. In one example, the peripheral wall 58 of the internal box 44 has four side walls to define a square or rectangular shape; however, it should be understood that the box 44 could have fewer or additional discrete side walls. Optionally, the peripheral wall 58 could be curved to provide an oval or circular shaped box.

In one example, the internal box 44 is positioned to only cover the baffle outlet 48, leaving the baffle inlet 46 uncovered as shown in FIG. 6. At least one deflector wall 60 is positioned within the internal box 44 to provide a wall surface 62 that is spaced from the peripheral wall 58 to define an internal flow path 64 that diverts the mixture of reducing agent and exhaust gas at least partially around the baffle outlet 48 before exiting the baffle outlet 48. There is an opening 66 in the peripheral wall 58 to receive exhaust gas exiting the baffle inlet 46 and to direct exhaust gas into the internal flow path 64. The opening 66 is preferably at a location that is not in a portion of the peripheral wall 58 that faces the baffle inlet 46.

In one example, the doser 36 is mounted to the cover 40 to inject the reducing agent in a direction toward the opening 66 in the peripheral wall 58. The cover 40 includes an opening 68 (FIG. 3) in the peripheral wall 52 at a location that faces the opening 66. The injection axis I (FIG. 5) extends in a direction that is directly into the internal flow path 64 of internal box 44 and does not directly face the baffle inlet 46 or outlet 48. This provides for more uniform mixing of the reducing agent R and exhaust gas G, as well as reducing deposit forming within the mixer assembly 30.

Figure 3:
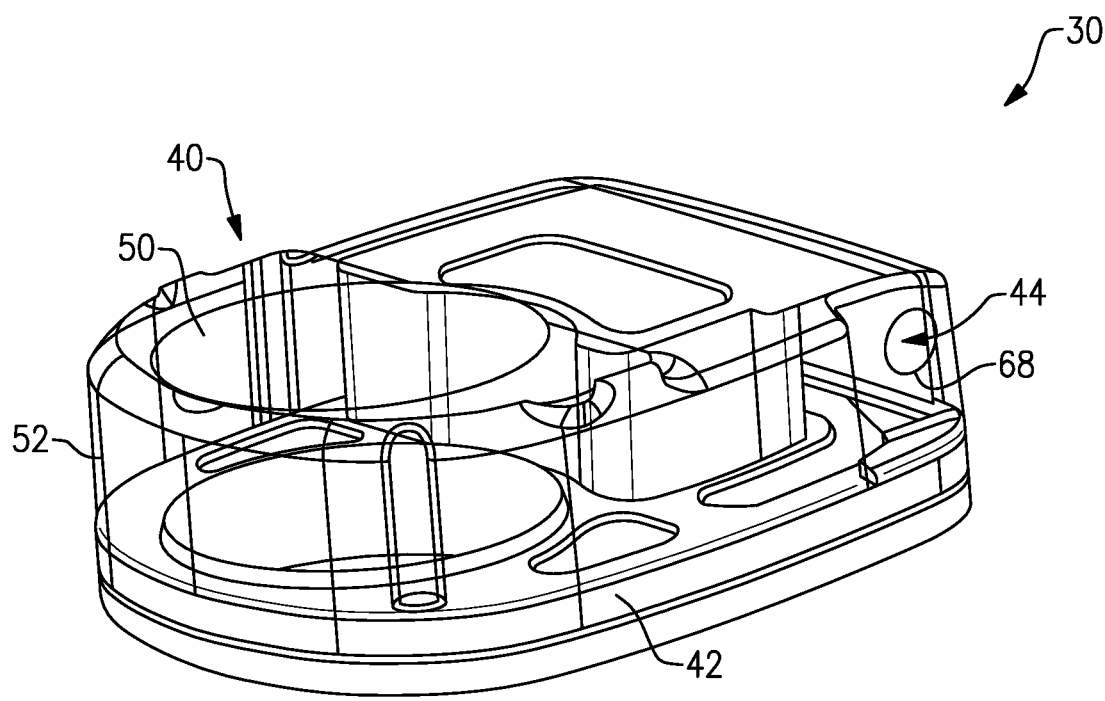
FIG. 3 is a perspective view of the mixer assembly with a cover, a baffle, an internal box, and a deflector wall.
Figure 4:
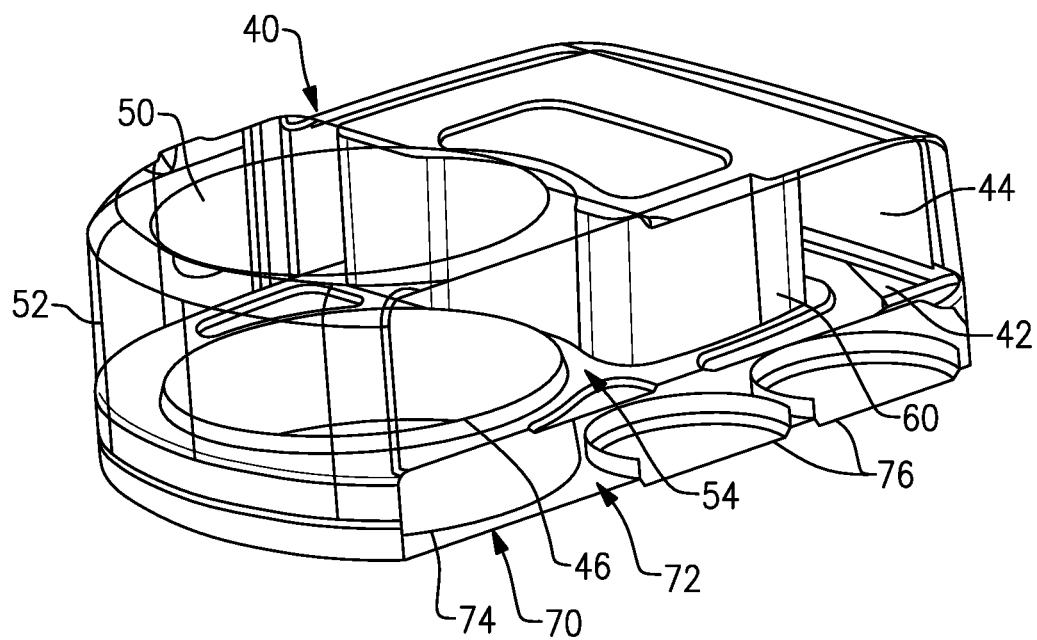
FIG. 4 is a view similar to FIG. 3 but with a portion of the cover removed.

As discussed above, the cover 40 provides the chamber 54 between the first baffle 42 and the internal surface of the cover 40. The internal box 44 is positioned between the base wall 50 of the cover and the baffle outlet 48 which leaves an open volume between the base wall 50 and baffle inlet 46 as shown in FIG. 3.

In one example, the mixer assembly 30 includes a second baffle 70 positioned on an opposite side of the first baffle 42 from the cover 40. This defines a second chamber 72 (FIG. 4) on an opposite side of the first baffle 42 from the first chamber 54. The baffle outlet 48 from the first baffle 42 directs the mixture of exhaust gas and reducing agent into the second chamber 72. In one example, the second baffle 70 includes a second baffle inlet 74 that faces the baffle inlet 46 of the first baffle 42 and one or more secondary baffle outlets 76 that face the SCR catalyst(s) 20. The number of secondary baffle outlets 76 can vary from a single outlet to as many as five or more outlets.

In one example, the DOC 16, DPF 18 and SCR 20 exhaust components are enclosed within the common housing 22 that is connected to the second baffle 70. In another example, the downstream exhaust component, e.g. SCR catalyst(s) 20, is positioned within the second chamber 72 such that the second baffle 70 forms part of the common housing 22.

As shown in the example of FIG. 6, the peripheral wall 58 of the internal box 44 includes at least a first wall 58a that extends between the baffle inlet 46 and the baffle outlet 48, a second wall 58b that is opposite the first wall 58a, a third wall 58c that connects the first wall 58a to the second wall 58b, and a fourth wall 58d opposite the third wall 58c and which includes the opening 66. In one example, the deflector wall 60 has a first wall portion 60a with a first side that faces the first wall 58a and a second side that faces the second wall 58b, and a second wall portion 60b that curves from one end of the first wall portion 60a to face the opening 66. The deflector wall 60 can also include a third wall portion 60c that curves from an opposite end of the first wall portion 60a to direct the mixture of reducing agent and exhaust gas around the baffle outlet 48.

As shown in FIG. 8, in one example there is a gap 80 formed between the bottom wall 56a of the internal box 44 and the base wall 50 of the cover 40. This gap 80 can be an open gap that receives exhaust gas or the gap can be at least partially filled with an insulating material 82. There may also be a gap 80 between the second wall 58b and/or third wall 58c of the internal box 44 and the peripheral wall 52 of the cover 40. The gaps 80 can be air gaps or filled with insulating material 82. The gap(s) 80 can be used to manage internal wall temperature, e.g. inside the internal box 44, to reduce the possibility of deposit formation.

There is also a gap 84 between the fourth wall 58d and the peripheral wall 52 of the cover 40. This gap 84 is an open gap that forms a portion of the flow path from the baffle inlet 46 to the opening 66 in the internal box 44.

In one example, the internal box 44 and/or the at least one baffle 42 may include at least one perforated area 90 to provide a bypass. This perforated area 90 can be used to reduce back pressure in the mixer assembly 30 as needed. Examples of where perforated area 90 can be located includes: in walls 58a and/or 58b and/or 58c and/or 58d and/or 56a and/or 60a and/or 60b and/or 60c. FIG. 6 shows an example where the perforated area 90 is located in base wall 56a. The perforated area 90 can be in only one location or multiple locations.

The internal box 44 defines an internal volume between the first baffle 42 and internal surfaces of the box 44 that is in communication with the baffle outlet 48. The internal box 44 only covers the baffle outlet 48 and includes the opening 66 such that the mixture of reducing agent and exhaust gas goes from the first chamber 54 into the internal volume. The deflector wall 60 is positioned within the internal box 44 such that a conduit/duct is formed to extend from the opening 66 to the baffle outlet 48. The length of the duct and the location and orientation of the deflector wall 60 in the internal box 44 improves overall mixing of the reducing agent and exhaust gas. Additional deflector walls or other mixing elements 92 could also be included within the box 44 to further improve mixing as indicated schematically at 92 in FIG. 9. Additional mixing elements could also be associated with the cover 40 and/or first baffle 42 as schematically indicated at 94.

Figure 9:
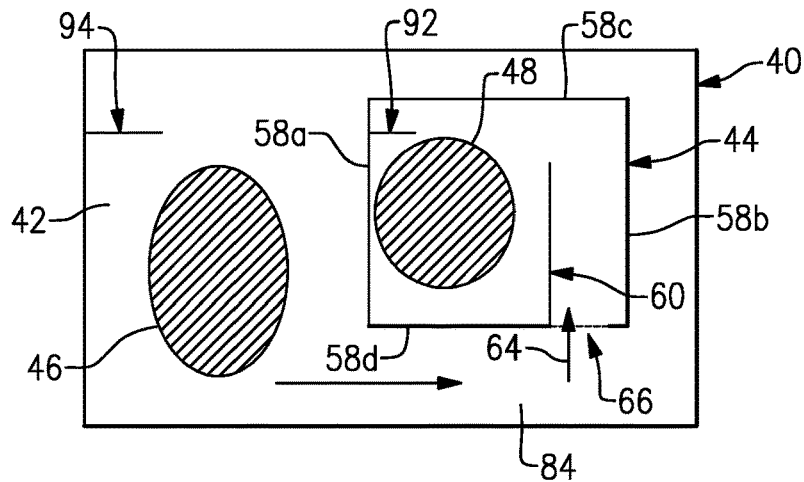
FIG. 9 is a top view of one embodiment of an internal flow path in the internal box.
Figure 11:
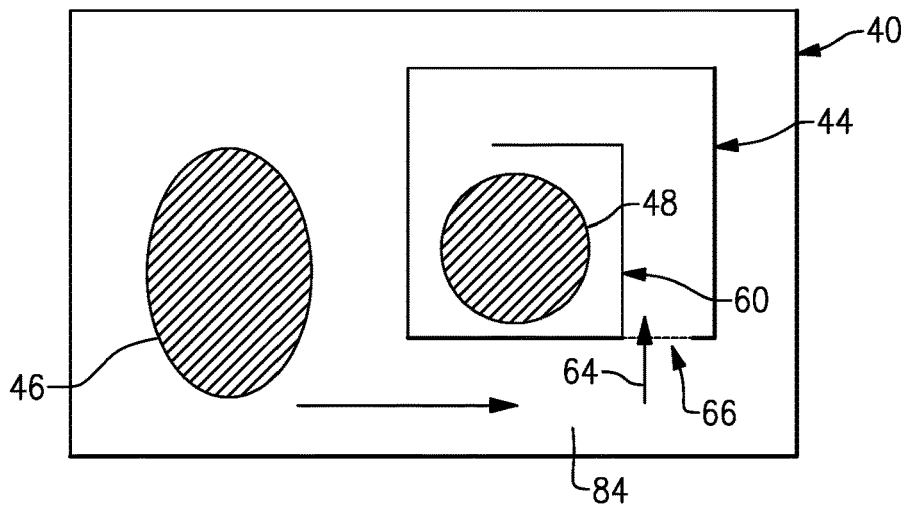
FIG. 11 is another embodiment of an internal flow path.

FIG. 9 shows an example of a first flow configuration where exhaust gas enters the gap 84 to mix with injected reducing agent and the mixture is then directed through the opening 66 of the box 44 and into the internal flow path 64. The deflector wall 60 prevents the mixture from directly exiting the outlet 48 and makes the mixed flow change direction at least once prior to exiting the box 44. FIG. 11 is similar to FIG. 9 but shows that the mixture changes direction at least twice within the box 44.

Figure 10:
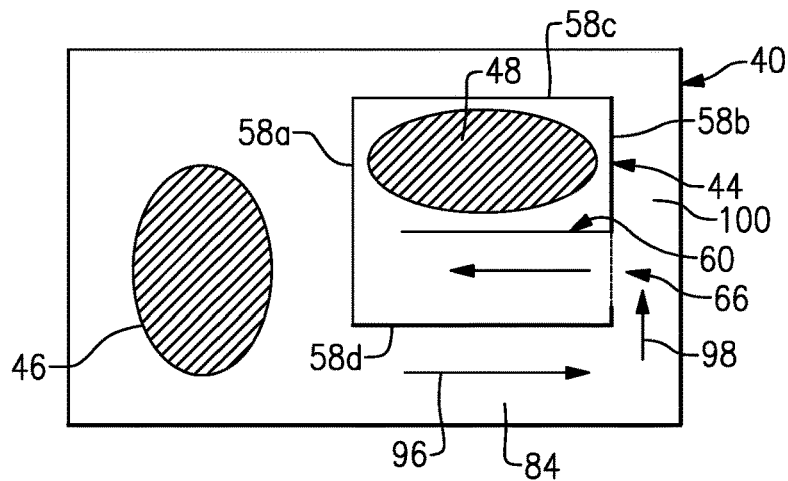
FIG. 10 is another embodiment of an internal flow path.

FIG. 10 shows an alternate location and/or shape for the baffle outlet 48. The opening 66 in this example is located in the second wall 58b of the box 44 instead of the fourth wall 58d. In this example, the exhaust gas flows in a first direction 96 in the gap 84 and then changes direction and flows in a second direction 98 in a gap 100 between the cover 40 and the second wall 58b. Flow enters the opening 66 and the deflector wall 60 prevents the mixture from directly exiting the outlet 48 and makes the mixed flow change direction at least once prior to exiting the box 44.

The internal box 44 can be attached to the first baffle 42 by welding, brazing, etc. for example. The internal box 44 can be formed from multiple pieces that are attached to each other, or can be formed as a single-piece structure. The deflector wall 60 can be integrally formed with the box 44 or separately attached.

The subject invention provides a mixing duct configuration with a single doser that thoroughly mixes the reducing agent and exhaust gas prior to entering the downstream exhaust component. The mixing duct configuration utilizes an internal box in combination with an internal deflector wall to define the flow guide path around a periphery of a mixer outlet. Further, the use of the deflector wall within the internal box increases mixing length to ensure that the reducing agent is thoroughly mixed with the exhaust gas and evenly distributed across one or more SCR catalysts.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A mixer assembly for a vehicle exhaust component comprising:
at least one baffle having a baffle inlet that receives exhaust gas from an upstream exhaust component and a baffle outlet that directs exhaust gas to a downstream exhaust component;
a cover configured to provide a chamber between an internal surface of the cover and the at least one baffle;
an internal box positioned within the chamber, the internal box including a bottom wall with a peripheral wall extending about at least a portion of an outer periphery of the bottom wall, and wherein the internal box is positioned to cover the baffle outlet such that a first side of the bottom wall faces the internal surface of the cover and a second side of the bottom wall faces the baffle outlet;
at least one deflector wall positioned within the internal box to extend between the second side of the bottom wall and the at least one baffle to provide a wall surface that is spaced from the peripheral wall to define an internal flow path that diverts exhaust gas at least partially around the baffle outlet before exiting the baffle outlet;
an opening in the peripheral wall to receive exhaust gas exiting the baffle inlet and to direct exhaust gas into the internal flow path; and
wherein the internal box and/or the at least one baffle includes at least one perforated area to provide a bypass.

2. The mixer assembly according to claim 1, including an injector mounted to the cover to inject a reducing agent to mix with the exhaust gas, and wherein the injector is positioned to inject the reducing agent upstream of the opening in the peripheral wall.

3. The mixer assembly according to claim 2, wherein the cover comprises a base wall with an outer wall extending about a periphery of the base wall to define the chamber between the at least one baffle and the internal surface of the cover, and wherein the internal box is positioned between the base wall and the baffle outlet, and wherein there is an open area between the base wall and baffle inlet that is separated from the baffle outlet by the bottom wall and peripheral wall of the internal box.

4. The mixer assembly according to claim 3, including a gap between the first side of the bottom wall of the internal box and the internal surface of the base wall of the cover.

5. The mixer assembly according to claim 4, including a second gap between an outer surface of the peripheral wall of the internal box and an inner surface of the outer wall of the cover.

6. A mixer assembly for a vehicle exhaust component comprising:
at least one baffle having a baffle inlet that receives exhaust gas from an upstream exhaust component and a baffle outlet that directs exhaust gas to a downstream exhaust component;
a cover configured to provide a chamber between an internal surface of the cover and the at least one baffle, wherein the cover comprises a base wall with an outer wall extending about a periphery of the base wall to define the chamber between the at least one baffle and the internal surface of the cover;

an internal box positioned within the chamber, the internal box including a bottom wall with a peripheral wall extending about at least a portion of an outer periphery of the bottom wall, and wherein the internal box is positioned to cover the baffle outlet such that a first side of the bottom wall faces the internal surface of the cover and a second side of the bottom wall faces the baffle outlet, and wherein the internal box is positioned between the base wall and the baffle outlet, and wherein there is an open area between the base wall and baffle inlet that is separated from the baffle outlet b the bottom wall and peripheral wall of the internal box;

at least one deflector wall positioned within the internal box to extend between the second side of the bottom wall and the at least one baffle to provide a wall surface that is spaced from the peripheral wall to define an internal flow path that diverts exhaust gas at least partially around the baffle outlet before exiting the baffle outlet;

an opening in the peripheral wall to receive exhaust gas exiting the baffle inlet and to direct exhaust gas into the internal flow path;

an injector mounted to the cover to inject a reducing agent to mix with the exhaust gas, and wherein the injector is positioned to inject the reducing agent upstream of the opening in the peripheral wall; and wherein the at least one baffle comprises a first baffle and the chamber comprises a first chamber, and including a second baffle positioned on an opposite side of the first baffle from the cover to define a second chamber, and wherein the baffle outlet from the first baffle directs a mixture of exhaust gas and reducing agent into the second chamber.

7. The mixer assembly according to claim 6, wherein the second baffle includes a second inlet that faces the baffle inlet of the first baffle and one or more secondary outlets that face the downstream exhaust component.

8. The mixer assembly according to claim 7, wherein the downstream exhaust component comprises one or more SCR catalysts.

9. The mixer assembly according to claim 7, wherein the upstream and downstream exhaust components are enclosed within a common housing that is connected to the second baffle.

10. The mixer assembly according to claim 7, wherein the bottom wall of the internal box comprises a first plate, the first baffle comprise a second plate that include the baffle inlet and the baffle outlet, and the second baffle comprises a third plate that includes the second inlet and the one or more secondary outlets, and wherein the first plate is between the cover and the second plate, and the second plate is between the first plate and the third plate, with the third plate being upstream of the downstream exhaust component.

11. The mixer assembly according to claim 6, wherein the downstream exhaust component is positioned within the second chamber.

12. A mixer assembly for a vehicle exhaust component comprising:

at least one baffle having a baffle inlet that receives exhaust gas from an upstream exhaust component and a baffle outlet that directs exhaust gas to a downstream exhaust component;

a cover configured to provide a chamber between an internal surface of the cover and the at least one baffle, wherein the cover comprises a base wall with an outer wall extending about a periphery of the base wall to define the chamber between the at least one baffle and the internal surface of the cover;

an internal box positioned within the chamber, the internal box including a bottom wall with a peripheral wall extending about at least a portion of an outer periphery of the bottom wall, and wherein the internal box is positioned to cover the baffle outlet such that a first side of the bottom wall faces the internal surface of the cover and a second side of the bottom wall faces the baffle outlet, and wherein the internal box is positioned between the base wall and the baffle outlet, and wherein there is an open area between the base wall and baffle inlet that is separated from the baffle outlet by the bottom wall and peripheral wall of the internal box;

at least one deflector wall positioned within the internal box to extend between the second side of the bottom wall and the at least one baffle to provide a wall surface that is spaced from the peripheral wall to define an internal flow path that diverts exhaust gas at least partially around the baffle outlet before exiting the baffle outlet;

an opening in the peripheral wall to receive exhaust gas exiting the baffle inlet and to direct exhaust gas into the internal flow path, wherein the peripheral wall of the internal box includes at least a first wall that extends between the baffle inlet and baffle outlet, a second wall that is opposite the first wall, a third wall that connects the first wall to the second wall, and a fourth wall opposite the third wall and which includes the opening; and an injector mounted to the cover to inject a reducing agent to mix with the exhaust gas, and wherein the injector is positioned to inject the reducing agent upstream of the opening in the peripheral wall.

13. The mixer assembly according to claim 12, wherein the wall surface of the deflector wall has a first portion with a first side that faces the first wall and a second side that faces the second wall, and wherein the wall surface includes a second portion that curves from one end of the first portion to face the opening.

14. The mixer assembly according to claim 13, wherein the wall surface includes a third portion that curves from an opposite end of the first portion to direct a mixture of reducing agent and exhaust gas around the baffle outlet.

15. A mixer assembly for a vehicle exhaust component comprising:

at least one baffle having a baffle inlet that receives exhaust gas from an upstream exhaust component and a baffle outlet that directs exhaust gas to a downstream exhaust component;

a cover configured to provide a chamber between an internal surface of the cover and the at least one baffle, wherein the cover comprises a base wall with an outer wall extending about a periphery of the base wall to define the chamber between the at least one baffle and the internal surface of the cover;

an internal box positioned within the chamber, the internal box including a bottom wall with a peripheral wall extending about at least a portion of an outer periphery of the bottom wall, and wherein the internal box is positioned to cover the baffle outlet such that a first side of the bottom wall faces the internal surface of the cover and a second side of the bottom wall faces the baffle outlet, and wherein the internal box is positioned between the base wall and the baffle outlet, and wherein there is an open area between the base wall and baffle inlet that is separated from the baffle outlet by the bottom wall and peripheral wall of the internal box;

at least one deflector wall positioned within the internal box to extend between the second side of the bottom wall and the at least one baffle to provide a wall surface that is spaced from the peripheral wall to define an internal flow path that diverts exhaust gas at least partially around the baffle outlet before exiting the baffle outlet;

an opening in the peripheral wall to receive exhaust gas exiting the baffle inlet and to direct exhaust gas into the internal flow path;

an injector mounted to the cover to inject a reducing agent to mix with the exhaust gas, and wherein the injector is positioned to inject the reducing agent upstream of the opening the peripheral wall;

a gap between the first side of the bottom wall of the internal box and the internal surface of the base wall of the cover; and insulating material that at least partially fills the gap.

16. A vehicle exhaust system comprising:

at least one of an upstream catalyst and/or filter;

at least one downstream catalyst, wherein the at least one of the upstream catalyst and/or filter and the at least one downstream catalyst are enclosed within a common housing; and a mixer assembly that connects an outlet from the at least one of the upstream catalyst and/or filter to an inlet to the at least one downstream catalyst, wherein the mixer assembly includes at least one baffle having a baffle inlet that receives exhaust gas from the at least one of an upstream catalyst and/or filter and a baffle outlet that directs exhaust gas to the at least one downstream catalyst, a cover comprising a base wall with an outer wall extending about a periphery of the base wall to define a chamber between the at least one baffle and an internal surface of the base wall of the cover, an internal box positioned within the chamber, the internal box including a bottom wall with a peripheral wall extending about at least a portion of an outer periphery of the bottom wall, and wherein the internal box is positioned between the base wall of the cover and the baffle outlet such that a first side of the bottom wall faces the internal surface of the base wall of the cover and a second side of the bottom wall faces the baffle outlet, leaving an open volume between the base wall and baffle inlet, at least one deflector wall positioned within the internal box that extends between the second side of the bottom wall and the at least one baffle to provide a wall surface that is spaced from the peripheral wall to define an internal flow path that diverts exhaust gas at least partially around the baffle outlet before exiting the baffle outlet, and an opening in the peripheral wall to receive exhaust gas exiting the baffle inlet and to direct exhaust gas into the internal flow path.

17. The vehicle exhaust system according to claim 16, including an injector mounted to the cover to inject a reducing agent to mix with the exhaust gas, and wherein the injector is positioned to inject the reducing agent upstream of the opening in the peripheral wall.

18. The vehicle exhaust system according to claim 16, including a gap between the first side of the bottom wall of the internal box and the internal surface of the base wall of the cover.

19. The vehicle exhaust system according to claim 18, including a second gap between an outer surface of the peripheral wall of the internal box and an inner surface of the outer wall of the cover.

20. A vehicle exhaust system comprising:

at least one of an upstream catalyst and/or filter;

at least one downstream catalyst; and a mixer assembly that connects an outlet from the at least one of the upstream catalyst and/or filter to an inlet to the at least one downstream catalyst, wherein the mixer assembly includes at least one baffle having a baffle inlet that receives exhaust gas from the at least one of an upstream catalyst and/or filter and a baffle outlet that directs exhaust gas to the at least one downstream catalyst, a cover comprising a base wall with an outer wall extending about a periphery of the base wall to define a chamber between the at least one baffle and an internal surface of the base wall of the cover, an internal box positioned within the chamber, the internal box including a bottom wall with a peripheral wall extending about at least a portion of an outer periphery of the bottom wall, and wherein the internal box is positioned between the base wall of the cover and the baffle outlet such that a first side of the bottom wall faces the internal surface of the base wall of the cover and a second side of the bottom wall faces the baffle outlet, leaving an open volume between the base wall and baffle inlet, at least one deflector wall positioned within the internal box that extends between the second side of the bottom wall and the at least one baffle to provide a wall surface that is spaced from the peripheral wall to define an internal flow path that diverts exhaust gas at least partially around the baffle outlet before exiting the baffle outlet, an opening in the peripheral wall to receive exhaust gas exiting the baffle inlet and to direct exhaust gas into the internal flow path, and wherein the at least one baffle comprises a first baffle and the chamber comprises a first chamber, and including a second baffle positioned on an opposite side of the first baffle from the cover to define a second chamber, and wherein the baffle outlet from the first baffle directs a mixture of exhaust gas and reducing agent into the second chamber.

21. The vehicle exhaust system according to claim 20, wherein the second baffle includes a second inlet that faces the baffle inlet of the first baffle and one or more secondary outlets that face the downstream exhaust component, and wherein the bottom wall of the internal box comprises a first plate, the first baffle comprise a second plate that includes the baffle inlet and the baffle outlet, and the second baffle comprises a third plate that includes the second inlet and the one or more secondary outlets, and wherein the first plate is between the cover and the second plate, and the second plate is between the first plate and the third plate, with the third plate being upstream of the downstream exhaust component.

22. A vehicle exhaust system comprising:

at least one of an upstream catalyst and/or filter;

at least one downstream catalyst; and a mixer assembly that connects an outlet from the at least one of the upstream catalyst and/or filter to an inlet to the at least one downstream catalyst, wherein the mixer assembly includes at least one baffle having a baffle inlet that receives exhaust gas from the at least one of an upstream catalyst and/or filter and a baffle outlet that directs exhaust gas to the at least one downstream catalyst, a cover comprising a base wall with an outer wall extending about a periphery of the base wall to define a chamber between the at least one baffle and an internal surface of the base wall of the cover, an internal box positioned within the chamber, the internal box including a bottom wall with a peripheral wall extending about at least a portion of an outer periphery of the bottom wall, and wherein the internal box is positioned between the base wall of the cover and the baffle outlet such that a first side of the bottom wall faces the internal surface of the base wall of the cover and a second side of the bottom wall faces the baffle outlet, leaving an open volume between the base wall and baffle inlet, at least one deflector wall positioned within the internal box that extends between the second side of the bottom wall and the at least one baffle to provide a wall surface that is spaced from the peripheral wall to define an internal flow path that diverts exhaust gas at least partially around the baffle outlet before exiting the baffle outlet, and an opening in the peripheral wall to receive exhaust gas exiting the baffle inlet and to direct exhaust gas into the internal flow path, wherein the peripheral wall of the internal box includes at least a first wall that extends between the baffle inlet and the baffle outlet, a second wall that is opposite the first wall, a third wall that connects the first wall to the second wall, and a fourth wall opposite the third wall and which includes the opening, and wherein the wall surface of the deflector wall has a first portion with a first side that faces the first wall and a second side that faces the second wall, and wherein the wall surface includes a second portion that curves from one end of the first portion to face the opening.

23. A vehicle exhaust system comprising:

at least one of an upstream catalyst and/or filter;

at least one downstream catalyst; and a mixer assembly that connects an outlet from the at least one of the upstream catalyst and/or filter to an inlet to the at least one downstream catalyst, wherein the mixer assembly includes at least one baffle having a baffle inlet that receives exhaust gas from the at least one of an upstream catalyst and/or filter and a baffle outlet that directs exhaust gas to the at least one downstream catalyst, a cover comprising a base wall with an outer wall extending about a periphery of the base wall to define a chamber between the at least one baffle and an internal surface of the base wall of the cover, an internal box positioned within the chamber, the internal box including a bottom wall with a peripheral wall extending about at least a portion of an outer periphery of the bottom wall, and wherein the internal box is positioned between the base wall of the cover and the baffle outlet such that a first side of the bottom wall faces the internal surface of the base wall of the cover and a second side of the bottom wall faces the baffle outlet, leaving an open volume between the base wall and baffle inlet, at least one deflector wall positioned within the internal box that extends between the second side of the bottom wall and the at least one baffle to provide a wall surface that is spaced from the peripheral wall to define an internal flow path that diverts exhaust gas at least partially around the baffle outlet before exiting the baffle outlet, an opening in the peripheral wall to receive exhaust gas exiting the baffle inlet and to direct exhaust gas into the internal flow path, a gap between the first side of the bottom wall of the internal box and the internal surface of the base wall of the cover, and a second gap between an outer surface of the peripheral wall of the internal box and an inner surface of the outer wall of the cover, wherein the gap and the second gap are at least partially filled with an insulating material.

* * * * *